126. STOVES & FURNACES,
Grates,
1,645 X
E. Nott,
Grate.
Patented June 29. 1833.
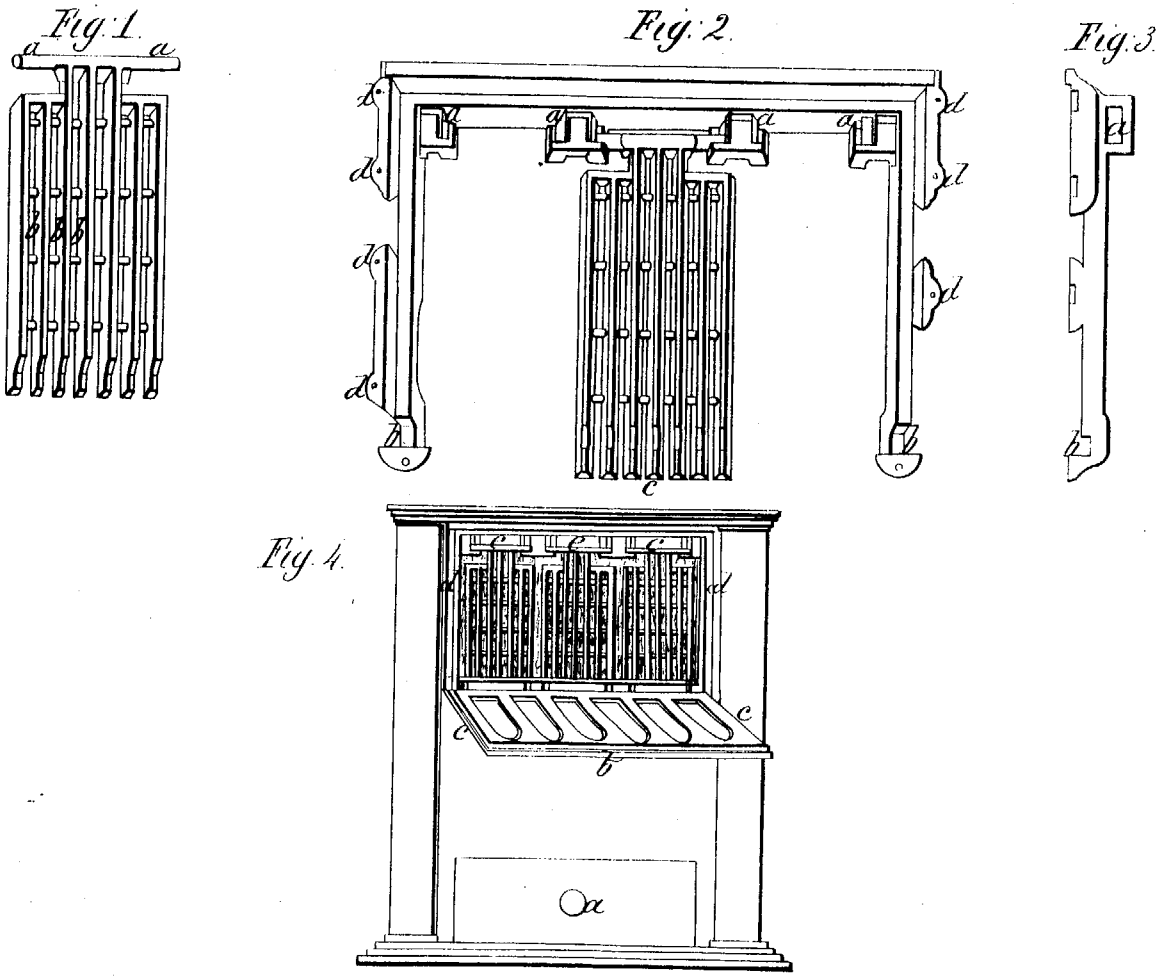
N. Peters Photo-Lithographer Washington, D.C.

76458X June 29, 1833

Case "L"

Eliphalet Nott.

Letters Patent.

The Schedule referred to in these Letters Patent, and making part of the same, containing a description in the words of the said Eliphalet Nott himself of his improvement, in the treatment of metallic bodies, and of bodies generally; as well those which admit of motion while under treatment, as those which require to be at rest.

---

Case "L."

Specification of improvements made in the treatment of Metallic bodies and of bodies generally; as well those which admit of Motion while under treatment as those which require to be at rest.
It having been discovered that metallic bodies oxidize less when exposed to the action of the products of combustion, than when exposed to the action of the elements of combustion; And it having also been discovered that contiguous bodies at different temperatures, and moving in opposite directions, exchange temperatures, therefore certain improvements for carrying these discoveries into effect have been made; which improvements consist;— In preventing the oxidizing of Metallic bodies by treating the same in all cases, in a chamber separate from the chamber of combustion; And in economizing the expenditure of heat generally by concentrating all the processes to which the same can be conveniently applied; and in arranging the whole in a series according to the degree of temperature required in each, always proceeding from the greater to the less, and in dividing the material to be treated into portions and arranging the same in successive localities and in passing the same (so far as they admit of being moved from one compartment to another) towards the chamber of treatment along the same channel through which the flame is caused to

7645X escape therefrom, and to act as it escapes on successive bodies
under treatment, till the whole available temperature they
has been expended, before the same enters the chimney; all
of which is effected, either By means of a vertical re=
verberatory or zigzag chamber of treatment consisting of
a series of compartments separated by solid and fixed floors
more or less inclined and arranged one above another, and
furnished with appropriate rests or ways for sustaining
incumbent bodies under treatment and for passing the
same down to the next locality when treated; and furnish-
ed also with apertures for inspection and for the ingress
and egress of bodies, and the introduction of the requi=
site instruments for adjusting and removing the same.
Or.—By means of a vertical reverberatory chamber of
treatment consisting, in like manner, in a series of com=
partments arranged one above another and separated
by floors in part solid and fixed, and in part open & mov=
able, either by levers, or eccentric axes, piercing the crust and
worked from without, in such manner that the contents
of each superior compartment can at pleasure be passed
down into the next inferior compartment.— Or, By means
of a vertical chamber of treatment without reverberation
consisting in like manner of a series of compartments
arranged one above another and separated by floors
more or less open and wholly moveable either by eccentric
or by central axes, piercing the crust and worked as aforesaid
from without in such manner that the contents of each superi
-or compartment, can be emptied by a revolution of its floors
into the compartment under it. Which several chambers
of treatment must be connected each at its lower extre=
mity with the outlet for flame from the chamber of com
bustion,— or with the outlet for flame from a cupola, having
an inlet for flame thereto from a separate chamber of
combustion

7645X combustion, or with a cupola or other furnace constructed
in the usual manner. And each must also be connected
at its upper extremity with an additional section of a hori-
zontal chamber of treatment exhibited in one or more chan-
nels for the application of the surplus heat in the treatment
of additional bodies requiring lower temperatures, as pit
coal and rosin contained in retorts for the production of gas,
and water in boilers for the generating of steam, to be appli-
ed for driving an engine and thereafter for heating additional
water for dying, bleaching, or any other process. For further
information reference must be had to the drawings and ex-
planations hereunto prefixed.

Summary.

The improvement herein contemplated consists; in preventing
the oxidizing of metallic bodies by heating them, whether in
cupolas, forges, or other furnaces, in a chamber separate from
the chamber of combustion, and in economizing the expenditure
of heat in the treatment of bodies generally that admit of being
exposed naked to the action of the fire, and of being re-
moved from one locality to another during the process; by
concentrating all the processes to which the same heat can
conveniently be applied, and arranging the order thereof ac-
cording to the intensity of temperature required by each, or
proceeding always from the greater to the less; and by dividing
into portions the bodies to be heated, and arranging the same
in successive localities, and moving such as admit of
motion during the process successively nearer to the chamber
of treatment; and by putting the new material to be treated,
and exclusive of that contained in the cupola, forge, or fur-
nace, into the compartment farthest from the chamber of combustion
and withdrawing the material when treated, from the compartment
nearest the chamber of combustion;_ and in causing the flame from
one common chamber of combustion to be applied to successive
proprocesses in continuity, until the whole available temperature thereof is expended, before the same is passed to the chimney; by means of a chamber of treatment interposed between a cupola, forge or other furnace, and a boiler; or chimney, if no boiler be in use; the same being constructed, connected, and managed either as exhibited in fig. 1, or in Fig 2. or in Fig 3, or in Fig 4. or partly as exhibited by the one, and partly by the other; or by any other means, provided only the chamber of treatment be separated from the chamber of combustion throughout.— And provided the different processes to which the same heat can be applied be concentrated, and the succession ordered according to the degree of temperature required by each, and provided also the material to be treated apart from the cupola, forge or furnace be divided into parcels arranged in successive localities, and if capable of motion, be moved in one direction towards the chamber of combustion along the same channel through which the flame is passing from the chamber of combustion in an opposite direction.—

I therefore claim as my invention and improvement the diminishing of the oxidizing of metallic bodies by treating them whether in cupolas, forges, or other furnaces, in a chamber distinct from the chamber of combustion, And the economizing of the expenditure of heat in the treatment of bodies generally, by concentrating all the processes to which the same heat can conveniently be applied, and arranging the order thereof according to the intensity of the temperature required by each.— And the dividing of the bodies to be treated exclusive of those contained in the cupola, forge, or other furnace into portions and arranging the same successively in successive localities, and in moving the bodies that admit of motion while under treatment, towards the chamber of combustion, along the same channel through which the flame is passing off from said chamber in an opposite direction;— always putting the the new material into the locality furthest from the chamber of combustion, and removing the material sufficiently heated from the locality nearest the chamber of combustion; by means of a special chamber of treatment, constructed, connected, and managed as already described; and is exhibited either in Fig 1. or Fig. 2, or Fig. 3. or Fig. 4 the same being interposed between a cupola, forge, or other furnace and the boiler, or the chimney if no boiler be in use; or by any other means; provided the chamber of treatment be separated from the chamber of combustion throughout; And provided the different processes to which the same heat can be applied be consociated and the succession ordered according to the degree of temperature required by each, and provided also the material to be heated be divided into parcels arranged in successive localities and if capable of motion, be moved in one direction toward the chamber of combustion along the same channel through which the flame is passing from the chamber of combustion in an opposite direction, together with the uses to which the same has been or may hereafter be applied in the reduction of Ores; the manufacture of iron or other Metals; the melting or heating of the same, to be cast or wrought into different forms, together with the other processes of art with which the same may be combined.

Witnesses
J. K. Boyd
D. Boyd

Eliph't Nott

Exd
[illegible]

Drawing in Portfolio (1500 words)

(Granted 29. June 1833)